US010314392B2

(12) United States Patent
Iellimo

(10) Patent No.: US 10,314,392 B2
(45) Date of Patent: Jun. 11, 2019

(54) STORAGE SYSTEM AND ARTICLE RETRIEVING METHOD

(71) Applicant: Frazier Industrial Company, Long Valley, NJ (US)

(72) Inventor: Domenick Iellimo, Forked River, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

(21) Appl. No.: 15/985,014

(22) Filed: May 21, 2018

(65) Prior Publication Data
US 2018/0332959 A1 Nov. 22, 2018

Related U.S. Application Data

(63) Continuation of application No. 14/886,476, filed on Oct. 19, 2015, now Pat. No. 9,999,300.

(51) Int. Cl.
*A47B 47/02* (2006.01)
*A47F 5/00* (2006.01)
*B65G 1/02* (2006.01)
*B65C 1/02* (2006.01)

(52) U.S. Cl.
CPC .......... *A47B 47/021* (2013.01); *A47B 47/028* (2013.01); *A47F 5/0018* (2013.01); *B65C 1/02* (2013.01); *B65G 1/02* (2013.01)

(58) Field of Classification Search
CPC . B65G 1/02; B65G 1/026; B65G 1/06; B65G 1/04; B65G 1/10; A47B 53/00; A47B 55/00; A47B 47/021; A47B 47/028; A47F 5/0018

USPC ........................................................ 211/151
See application file for complete search history.

(56) References Cited

U.S. PATENT DOCUMENTS

| | | | | |
|---|---|---|---|---|
| 2,894,641 | A * | 7/1959 | Edwards, Jr. ........ | A47B 47/022 211/134 |
| 2,963,169 | A * | 12/1960 | Koustant .............. | A47B 47/022 211/134 |
| 3,323,655 | A | 6/1967 | Foran et al. | |
| 3,664,513 | A * | 5/1972 | Atwater ................... | B65G 1/02 211/134 |
| 3,757,967 | A * | 9/1973 | Colbridge ................ | B65G 1/02 14/42 |

(Continued)

FOREIGN PATENT DOCUMENTS

EP 0148093 A1 7/1985

*Primary Examiner* — Patrick D Hawn
(74) *Attorney, Agent, or Firm* — Dilworth & Barrese, LLP

(57) ABSTRACT

An apparatus is disclosed that provides a storage system designed to allow pickers to easily and efficiently pull products from all portions of the storage system from a single side of the storage system. The storage system includes a first storage rack that has a first plurality of columns and a first platform extending from one of the first plurality of columns. An outer edge of the first platform forms an end of the first storage rack. Positioned adjacent to the first storage rack is a second storage rack with a second plurality of columns and a second platform that extends from one of the second plurality of columns, where an outer edge of the second platform forms an end of the second storage rack. An aisle is formed by a predetermined distance between the outer edges of the first and second platforms.

14 Claims, 8 Drawing Sheets

(56) References Cited

U.S. PATENT DOCUMENTS

| | | | |
|---|---|---|---|
| 3,762,335 A | 10/1973 | Baker, Jr. et al. | |
| 3,785,502 A | 1/1974 | Konstant | |
| 4,116,343 A * | 9/1978 | Hall | B65G 1/10 |
| | | | 211/151 |
| 4,459,078 A | 7/1984 | Chiantella et al. | |
| 4,462,500 A | 7/1984 | Konstant et al. | |
| 4,541,344 A | 9/1985 | Nichols | |
| 4,633,788 A | 1/1987 | Robertson | |
| 4,949,852 A | 8/1990 | Allen | |
| 4,991,725 A * | 2/1991 | Welsch | A47B 53/02 |
| | | | 211/162 |
| 5,273,170 A | 12/1993 | Azzopardi et al. | |
| 5,312,004 A * | 5/1994 | Krummell | A47B 53/00 |
| | | | 211/151 |
| 5,316,157 A | 5/1994 | Konstant | |
| 5,328,038 A | 7/1994 | Allen | |
| 5,964,361 A | 10/1999 | Mefford et al. | |
| 6,062,400 A | 5/2000 | Schieler et al. | |
| 6,260,719 B1 | 7/2001 | Azzopardi et al. | |
| 6,652,213 B1 | 11/2003 | Mitchell et al. | |
| 6,751,914 B2 * | 6/2004 | Zeh | A47B 83/001 |
| | | | 108/60 |
| 7,810,656 B2 * | 10/2010 | Lewis | B65G 1/06 |
| | | | 211/151 |
| 7,829,838 B2 | 11/2010 | Haubenschild et al. | |
| 8,234,983 B2 * | 8/2012 | Randolph | A47B 47/022 |
| | | | 108/108 |
| 8,812,148 B2 * | 8/2014 | Kharkover | E04H 6/225 |
| | | | 414/227 |
| 9,020,632 B2 | 4/2015 | Naylor | |
| 9,334,114 B2 | 5/2016 | Salichs et al. | |
| 9,643,781 B2 * | 5/2017 | Salichs | B65G 1/026 |
| 9,850,066 B2 * | 12/2017 | Salichs | B65G 1/026 |
| 2003/0229416 A1 | 12/2003 | Tai et al. | |
| 2004/0211741 A1 | 10/2004 | Bustos et al. | |
| 2005/0281641 A1 | 12/2005 | Maynard et al. | |
| 2006/0237378 A1 | 10/2006 | Pellegrino et al. | |
| 2007/0262685 A1 | 11/2007 | Randolph | |
| 2008/0208389 A1 | 8/2008 | Checketts | |
| 2010/0322747 A1 | 12/2010 | Lert et al. | |
| 2012/0195720 A1 | 8/2012 | Sullivan et al. | |
| 2013/0068705 A1 | 3/2013 | Parker | |
| 2013/0105428 A1 | 5/2013 | Yaniak et al. | |
| 2013/0276679 A1 | 10/2013 | Kroeplien et al. | |
| 2015/0101998 A1 | 4/2015 | Kreck | |

* cited by examiner

STORAGE SYSTEM AND ARTICLE RETRIEVING METHOD

BACKGROUND

The present disclosure generally relates to a storage system that provides easier access to multiple portions of a storage rack.

Storage systems are used in warehouses, department stores, and storage facilities to store products thereon. The storage systems containing a plurality of storage racks may hold large amounts and a variety of products that consumers or pickers pull from. Some storage systems are designed in a manner to provide support with insufficient accessibility, thereby requiring additional resources and time for workers to pull all of the products they require to fill a particular order. For example, some storage systems include a horizontal bar that extends to another storage system adjacent thereto; the horizontal bar provides support for both storage system structures. However, the horizontal bar obstructs the pathway for the consumer or picker to access products on an opposite side of the horizontal bar.

SUMMARY

A storage system and method that provides greater accessibility to a greater number of products is provided.

The storage system comprises a first storage rack that includes a first plurality of columns; and a first platform extending from at least one of the first plurality of columns, wherein a first outer edge of the first support bar forms an end of the first storage rack; a second storage rack that includes a second plurality of columns; and a second platform extending from at least one of the second plurality of columns, wherein a second outer edge of the second platform forms an end of the second storage rack; and the first storage rack is positioned adjacent to the second storage rack, and the first and second outer edges of the first and second platforms are a predetermined distance from each other thereby creating an aisle.

Another storage system is also provided herein, wherein the storage system includes a first platform having an outer edge and positioned above a base surface; and a second platform having an outer edge and positioned above the base surface, the outer edge of the first platform positioned a predetermined distance from the outer edge of the second platform.

As another example, a storage rack is also disclosed herein, wherein the storage rack includes a base surface; a first column directly or indirectly attached to the base surface; and a support bar directly or indirectly attached to the first column, wherein the support bar extends substantially perpendicular from the first column, the support bar is configured to support a pallet, wherein a distance between the base surface and the support bar forms a space configured to extend a reach of a worker.

BRIEF DESCRIPTION OF THE DRAWINGS

Like reference numerals indicate similar parts throughout the figures.

DETAILED DESCRIPTION OF PREFERRED EMBODIMENT(S)

Figure 1:
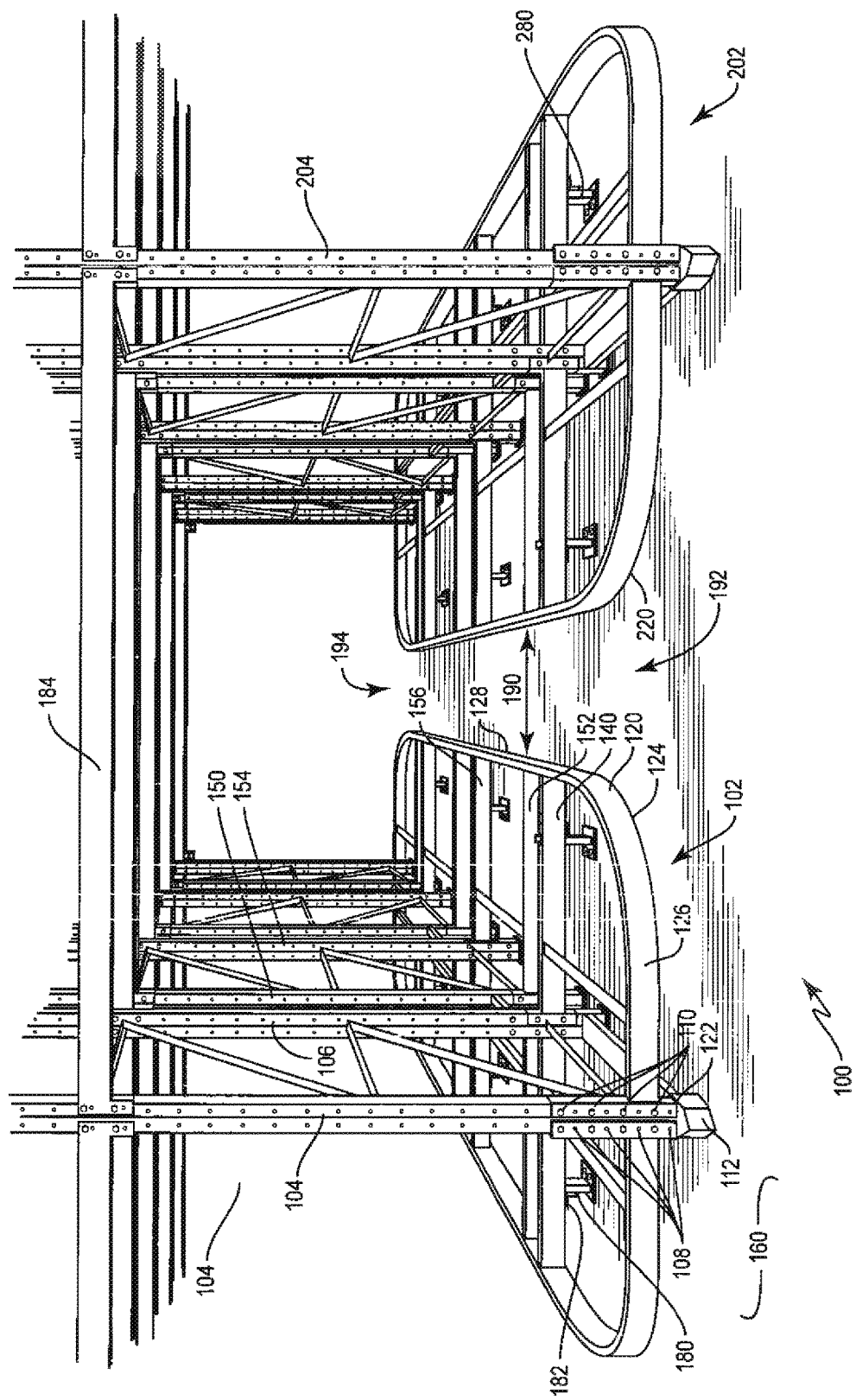
FIG. 1 is a perspective view of a storage system in accordance with aspects of the disclosure.

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

A storage system 100 according to the present disclosure includes at least two adjacent support platforms 102, 202. Support platforms 102, 202 are elongated and positioned off the floor. Support platforms 102, 202 are spaced apart from each other by a defined distance, creating an aisle therebetween. In a preferred embodiment support platforms 102, 202 are designed to accommodate a standard shipping pallet. For multi-level storage systems, vertical columns are provided to support an upper level. Horizontal beams are connected to the columns for support of the upper level and also define a width of the aisle. Storage system 100 provides access to all of the items stored on the platforms.

Storage system 100 described herein includes a first and second column 104, 106, and a support bar 120 that is directly or indirectly attached to either the first or second column 104, 106, or both. Support bar 120 creates part of a first storage platform 102 that provides support for the products that are stored thereon. Horizontal bar 140 extends from second column 106 to support bar 120, but does not go beyond support bar 120. In this regard, an area covered by and adjacent to support bar 120, first and second columns 104, 106, and horizontal bar 140 may be considered one storage unit. Further, support bar 120 may extend beyond a plurality of columns past the second column 106, thereby creating additional storage units for more products to be stored on. A second storage platform 202 is positioned adjacent to storage platform 102 and include similar components to storage platform 102. An aisle 190 is formed between support bar 120 and support bar 220. In this regard, a worker is able to safely access products in subsequent storage units (e.g., second, third, fourth storage units) that are beyond the first storage unit.

As illustrated in FIG. 1, aisle 190 is formed between storage platforms 102 and 198. The aisle 190 is formed between support bars 120 and 220 of storage platforms 102 and 202, respectively. The formation of storage platforms 102 and 202 and the formation of aisle 190 is discussed in more detail below.

Figure 2:
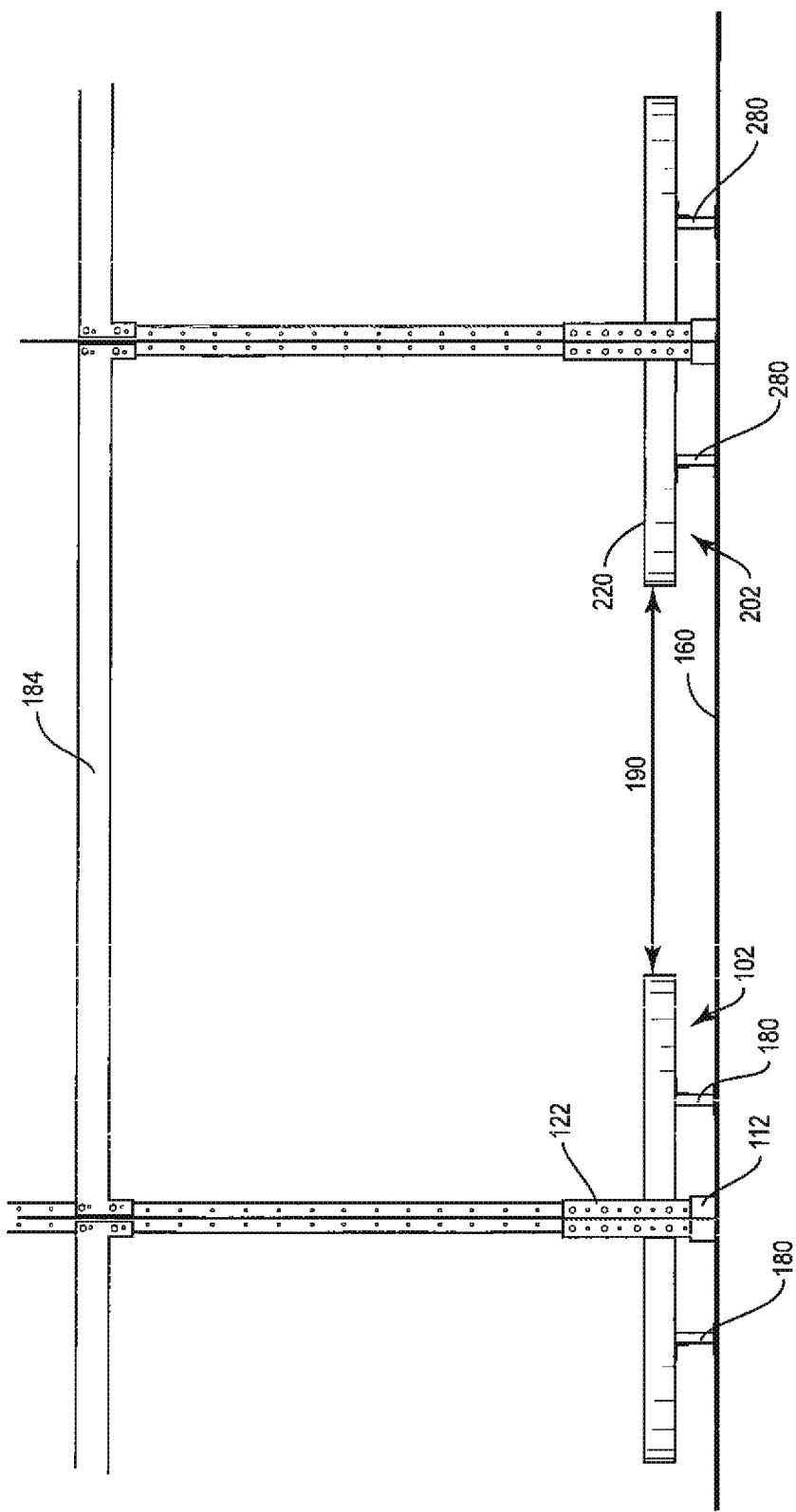
FIG. 2 is a front view of the storage system in accordance with aspects of the disclosure.
Figure 3:
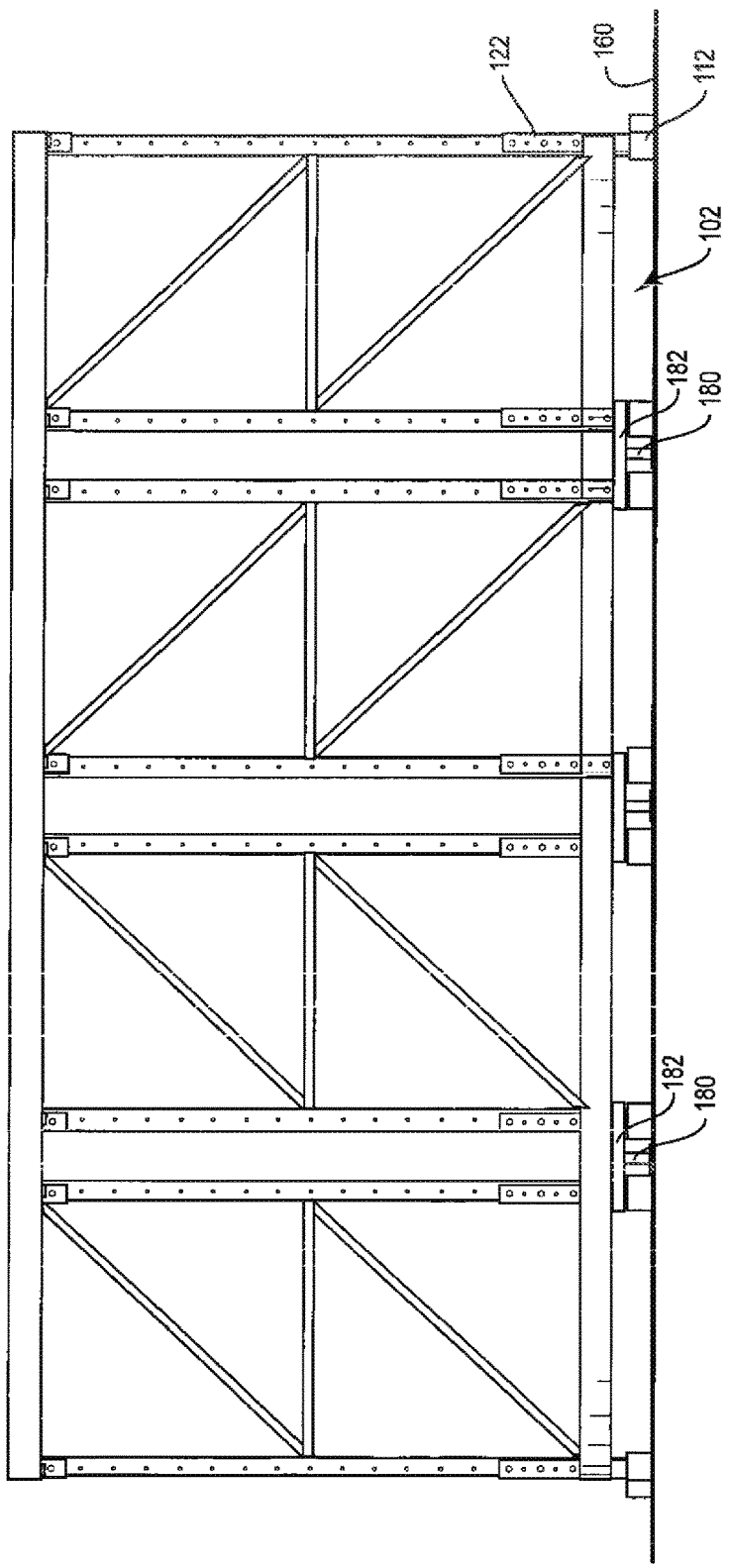
FIG. 3 is a side view of the storage system in accordance with aspects of the disclosure.

As illustrated in FIGS. 1-3, first and second columns 104, 106 stand in a vertical position, perpendicular to base level 160 (e.g., the floor). First and second columns 104, 106 provide support for other components of storage system 100 so that storage system 100 is able to hold various products. First and second columns 104, 106 may have one or more bores 108 thereon in order to fasten other components to storage system 100, such as by using bolts 110. Other fastening methods are contemplated, including, but not limited to, rivets or welds. For instance, beam 184 positioned at an upper portion of first column 104 is attached to first column 104 via bolts 110. Beam 184 is one of a plurality of beams that provide support to the overall structure of storage system 102. As illustrated in FIG. 1, beam 184 extends across between storage platforms 102 and 202 as well and provides support to beam 204. It should be noted, however, that although beam 184 is utilized in the present structure, storage systems 102 and 202 may be designed without the presence of beam 184. It should further be noted that first and second columns 104, 106 each may be a single column or a plurality of columns joined together.

As another example, as illustrated in FIG. 1 first column 104 is attached to connecting portion 122 of support bar 120 via bolts 110. Other ways to fasten the support bar 120 or other components to first and second columns 104, 106 are also possible, such as notches in the columns that components can slide into and out of. Furthermore, there may be a plurality of bores, notches, etc. on first column 104 to allow adjustability of the component attached thereto, like support bar 120.

First and second columns 104, 106 may also have base portion 112 at a bottom end of the columns that provide sufficient support to the overall columns. Base portion 112 may be adapted so that support bar 120 cannot go below a level of base portion 112. Alternatively, base portion 112 may have a cut-out or otherwise be designed so that support bar 120 or other components connected thereto is not obstructed by the presence of base portion 112. It should be noted that any discussion of additional columns herein may be designed similar to first and second columns 104, 106 described above.

Support bar 120 is attached to first column 104 via one of the attaching methods discussed above (e.g., bolts). Although FIG. 1 depicts connecting portion 122 of support bar 120 extending vertically across a plurality of bores of first column 104, the attachment mechanism is not restricted thereto, but rather connecting portion 122 may extend longer or shorter along first column 104. Alternatively, connecting portion 122 may be welded to first column 104 or be integrally formed.

As shown in FIG. 1, support bar 120 extends horizontally outward from first column 104 in an arcuate manner. It should be noted that support bar 120 does not necessarily have to be a single structure, but may be a plurality of bars coupled together. Each bar of the plurality of bars may be various shapes and sizes as well, such as shorter or longer lengths, shorter or longer widths, or some bars being stronger or weaker structurally than others to support various weights.

Support bar 120 extends from first column 104 and curves at a right angle at arcuate portion 124. In this regard, support bar 120 has a first portion 126 that arches at arcuate portion 124 and extends toward and across second column 104 at second portion 128 of support bar 120. The second portion 128 of support bar 120 may extend across the entire storage system 100, depending on how many columns beyond second column 106 the storage system 100 incorporates. It should be noted that the storage system 100 is not limited to any number of columns. As shown in FIG. 1 and discussed further below, the support bar 120 may form an end of storage system 100 in that no other bars extend beyond support bar 120.

Arcuate portion 124 of support bar 120 is a single piece of metal that has been hydraulically bent to create the arching curve. As discussed above, however, arcuate portion 124 of support bar 120 may be put together by a plurality of support bars, such as two support bars slightly curved that attach in the middle of the curve. In addition, support bar 120 or any other component of storage system 100 (e.g., first and second columns 104, 106, vertical support bar 180, etc.) may be manufactured from metal, but other materials are also considered. For example, if lighter products are being stored on storage system 100 then a strong plastic material may be possible.

Support bar 120 is designed with an arcuate portion 124 to provide a non-cornered surface. Thus, when a picker accidently walks into or skims their leg against the arcuate portion, the picker's leg will avoid injury on the smooth surface. The picker may be the person or worker whose responsibilities include going to the storage system 100 and pulling products therefrom. For example, the picker may drive a forklift or other type of truck capable of holding products to the various storage systems to fill an order. When the picker gets to the particular storage system with the product they need, they go over to the storage rack, pull the necessary products, and put the products on the truck. From here, the picker will go to the next storage system to pull the next required product.

If the support structure created a right angle that formed a corner, a picker's leg may be injured. However, it should be noted that the present disclosure is not restricted to a particular curve or shape. For example, more obtuse or acute curves may be implemented as well. Alternatively, a right angle may be formed. A protective padding or other material may be placed over the support structure, whether the support structure is curved or not, to help avoid injury to workers. The padding is not restricted to the right angle or curved section, but over any portion of storage system 100 where there may be potential for injury.

Figure 4:
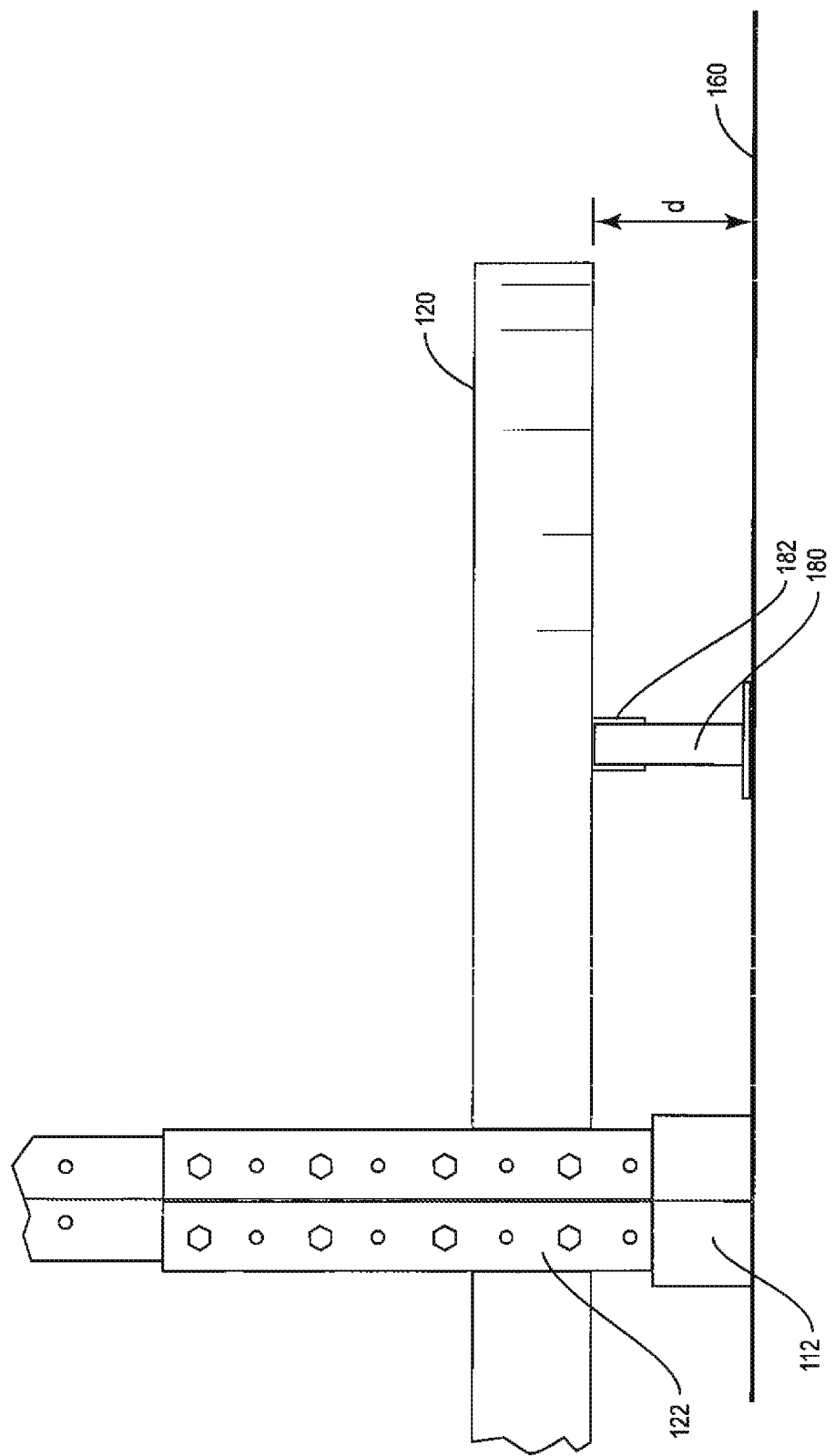
FIG. 4 illustrates a support bar of the storage system in accordance with the present disclosure.

As illustrated in FIGS. 2-4, the support bar 120 is spaced above the ground to provide additional foot room for pickers. The additional space above the ground may be anywhere from 5-15 inches, but is not restricted thereto. The space may be even as low as 1 inch but as high as three feet. For example, as shown in FIG. 4 there is a 10 inch space between base level 160 and support bar 120. Support bar 120 being positioned at a slightly raised level above base level 160 creates a space for a user to slide their foot underneath support bar 120. This way, the picker has a couple of more inches of space to pull products off of storage system 102, thereby extending the picker's reach to grab products. For instance, when the products on the storage system begin to deplete, remaining products may be positioned near the back of storage platform 102, such as near first and second columns 104, 106. The couple of extra inches provided by the user's feet may not only help and make the picker's job easier, but may also help avoid injury due to awkward positioning when lifting. If support bar 120 was directly against the ground or did not provide enough space for a picker's foot to go underneath, then the picker would be constrained to the distance provided by the bar when reaching for products.

Second portion 128 of support bar 120 connects with first horizontal bar 140. First horizontal bar 140 is connected to second column 106, in which first horizontal bar 140 may be connected using bolts, notches, etc. as described above with respect to connecting portion 122 and first column 104. First horizontal bar 140 is attached to support bar 120 and provides support in conjunction with support bar 120 to products that are stored on that portion of storage system 102. In this regard, the space adjacent to and formed between and around the first column 104, support bar 120, and first horizontal bar 140 may be considered one storage unit. Each storage unit on storage system 100 may be capable of holding one pallet of product. It should be noted the present disclosure is not restricted to any particular size pallet or amount of material, but can be customizable based on the particular needs of the business. For instance, the pallet and units may be designed smaller or larger based on the particular business, requirements, products, etc. As illustrated in FIG. 1, adjacent storage platform 202 also includes storage units that are lined up with the storage units of storage platform 102. It should be noted support bar 120 is depicted as a bar to hold pallets of products, a platform or any other structure capable of providing support may be used as well.

Subsequent storage units beyond the first storage unit may also be formed in a similar fashion. For example, as shown in FIG. 1 there is a third column 150 and fourth column 154, respectively, that are adjacent to second column 106. Second horizontal bar 152 is attached to the third column 150 and a third horizontal bar 156 is attached to the fourth column 154. Second horizontal bar 152 and third horizontal bar 156 attaches to support bar 120. The portion of storage platform 102 formed between and adjacent to third and fourth columns 150, 154, second and third horizontal bars 152, 156, and support bar 120 may be considered a second storage unit. Any number of additional storage units can be added beyond the first and second storage units in a similar fashion. It should be noted the distance between second and third horizontal bars 152, 156 may depend on the particular business and desired structure, which in turn may affect the size of the second storage unit generated. Further the distances between all horizontal bars and the positioning of the support bar may vary as well based on the particular products and needs of the business.

Referring back to second and third horizontal bars 152, 156, neither horizontal bar extends beyond support bar 120. In this regard, support bar 120 forms an end of storage platform 102 in that no other components of storage system 100 extends therebeyond. Similarly, storage platform 202 includes a plurality of columns and horizontal bars attached thereto that do not extend beyond support bar 220.

In this regard, all of storage platforms 102 and 202 may be accessible from first side 192 and second side 194 without any obstruction. Prior art types of storage systems may position two separate storage systems across from each other and connect them via horizontal bars at height that obstructs human movement, so that the horizontal bar provides support for both storage systems. In this scenario, however, a picker is unable to access units beyond the horizontal bars unless they climb over, move around, or bend underneath the horizontal bar(s). This not only raises safety concerns, but also makes the job of the picker more difficult and thereby wastes resources. Alternatively, the picker is forced to move on the other side of the storage system to access the products, such as by maneuvering a truck or walking. This also takes additional time and wastes resources.

By removing the horizontal bar from extending between storage platforms 102 and 202, a picker that is pulling product from first side 192 of storage platform 102 is able to walk through aisle 190, and pull products from subsequent storage units of storage platform 102 on second side 194, as illustrated in FIG. 1. These subsequent storage units would typically be accessed by driving a truck to the other side of the storage system, but due to the removal of the obstructing horizontal bar the user is able to access the storage units on the second side 194 instantly and simultaneously. It should be noted, however, that although the figures depict no structural bars of storage system 100 extending beyond support bar 120, the present disclosure is not restricted thereto. Rather, structural bars or component may extend beyond support bar 120, as long as the aisle 190 is maintained for the picker to walk through and access the products on subsequent storage units. For instance, support structures may extend beyond support bar 190 that provide additional support.

Figure 5:
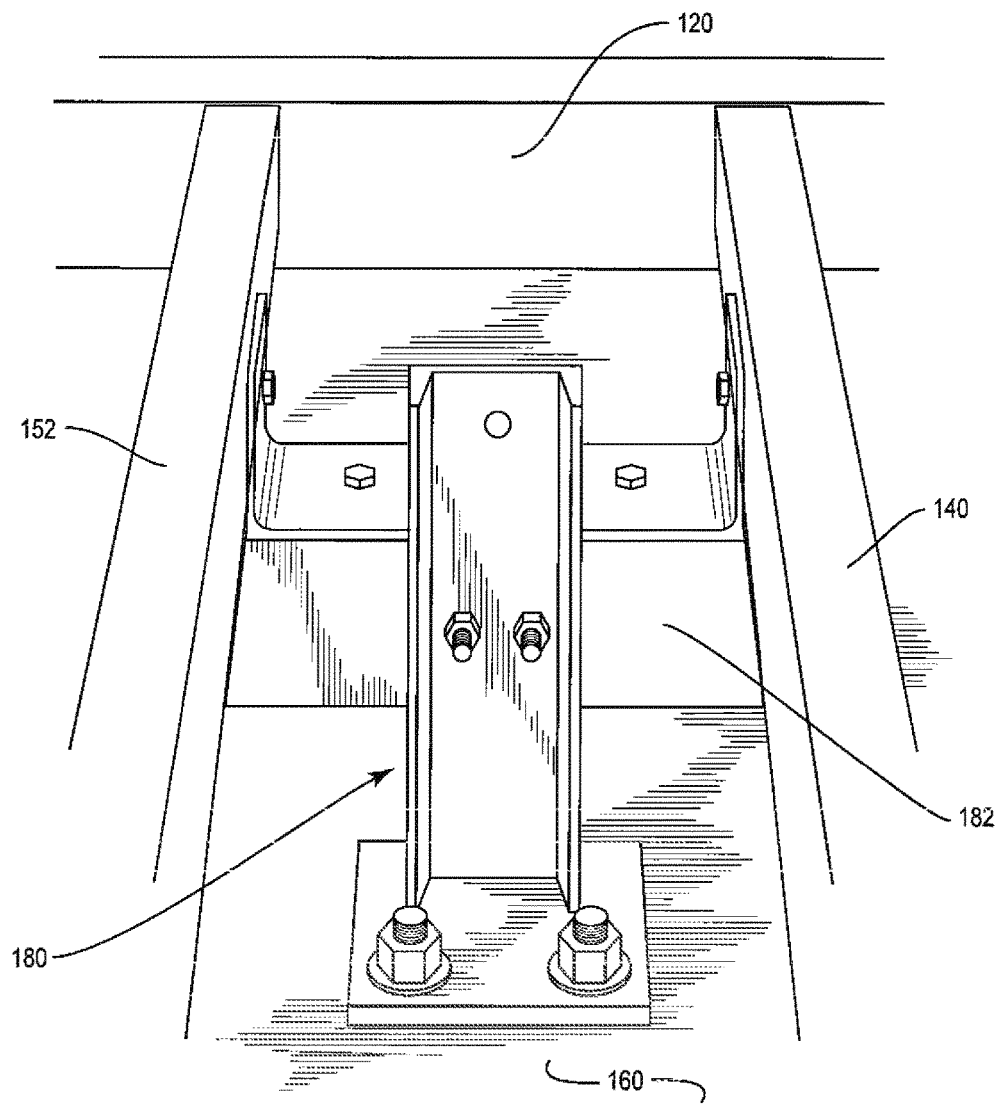
FIG. 5 illustrates a vertical support bar in accordance with aspects of the disclosure.

As shown in FIG. 5, storage system 100 of the present disclosure implements a vertical support bar 180 that is positioned beneath first and second horizontal bars 140, 152. Vertical support bar 180 provides additional support for first and second horizontal bars 140, 152. Vertical support bar 180 may be positioned a certain distance from support bar 120 so that a foot of a worker does not accidently hit into vertical support bar 180. In this way, positioning vertical support bar 180 a distance from support bar 120 helps reduce the chances of injury to the worker. The distance from support bar 120 to vertical support bar 180 may be, for example, anywhere from one to ten inches. It should be noted, however, that the present technology is not limited to vertical support bar 180 being one to ten inches from support bar, rather vertical support bar 180 may be positioned at any location beneath first and second horizontal bars 140, 152. In addition, vertical support bar 180 may be positioned at other locations as well, such as beneath support bar 120 or at a connection point of second and third horizontal bars 152, 156 and support bar 120. Multiple vertical support bars 180 are also possible, such as multiple vertical support bars implemented beneath second horizontal bar 140, support bar 120, or a combination thereof. Additionally, although FIG. 1 depicts vertical support bar 180 beneath both horizontal bars, it may be positioned under just one. For instance, both horizontal bars may have their own vertical support bar 180. The location and positioning of the vertical support bars may depend on the overall structural design of the storage system 100 and the needs for the particular business, and may range anywhere between and including both ends of the particular bar.

Vertical support bar 180 may be secured to base level 160 by bolts. For instance, a bottom portion of the vertical support bar 180 may lay flat to base level 160, the flat portion of which is capable of receiving bolts to secure vertical support bar 180 to base level 160. As illustrated in FIG. 4 vertical support bar 180 is attached to a bracket 182. Bracket 182 is in turn attached to first horizontal bar 140 and second horizontal bar 152. First and second horizontal bars 140, 152 rest on bracket 182, bracket 182 being secured to vertical support bar 180. Although in the examples shown in FIG. 4 vertical support bar 180 is separate from bracket 182, these components may alternatively be formed of the same piece of material.

As another alternative, first and second horizontal support bars 140, 152 may be replaced with a single horizontal bar. In this scenario, the single horizontal bar may provide support for products on the first unit and the second unit. Vertical support bar 180 may attach to, or be made integral with, the single horizontal bar.

Figure 6:
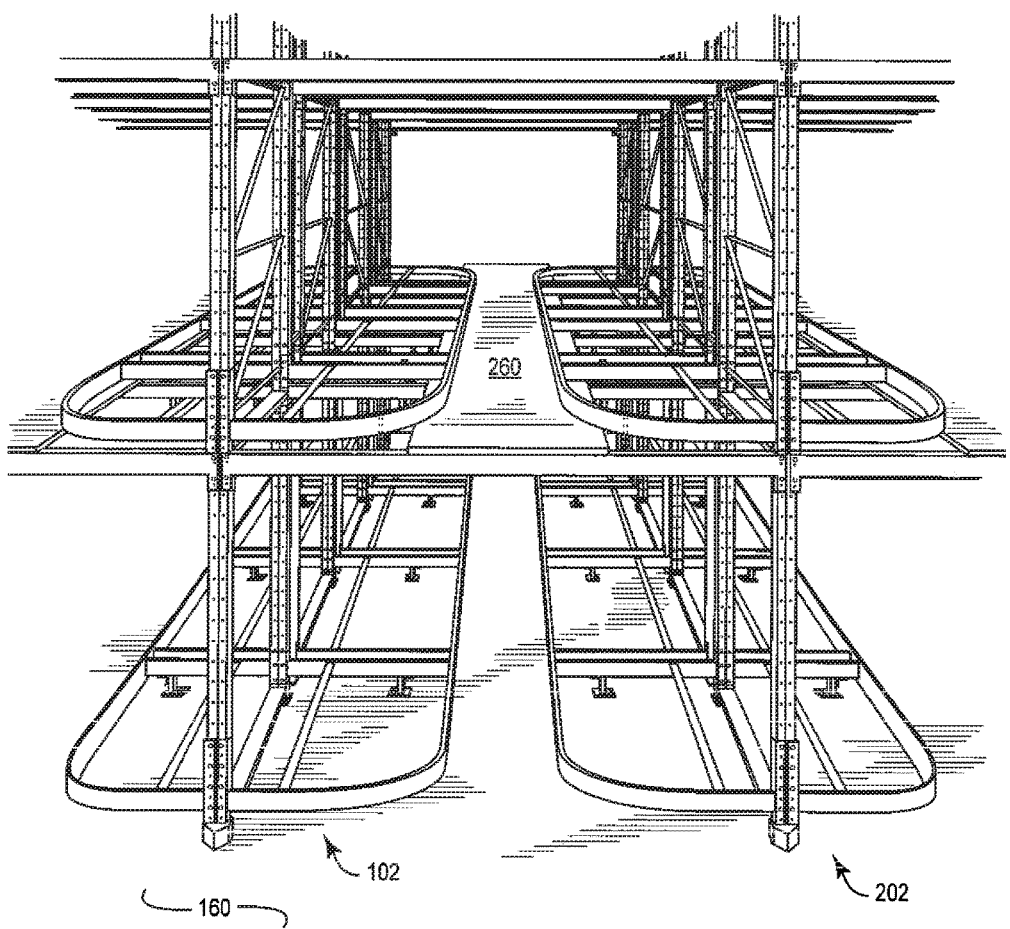
FIG. 6 depicts the storage system implemented on multiple levels in accordance with aspects of the disclosure.
Figure 7:
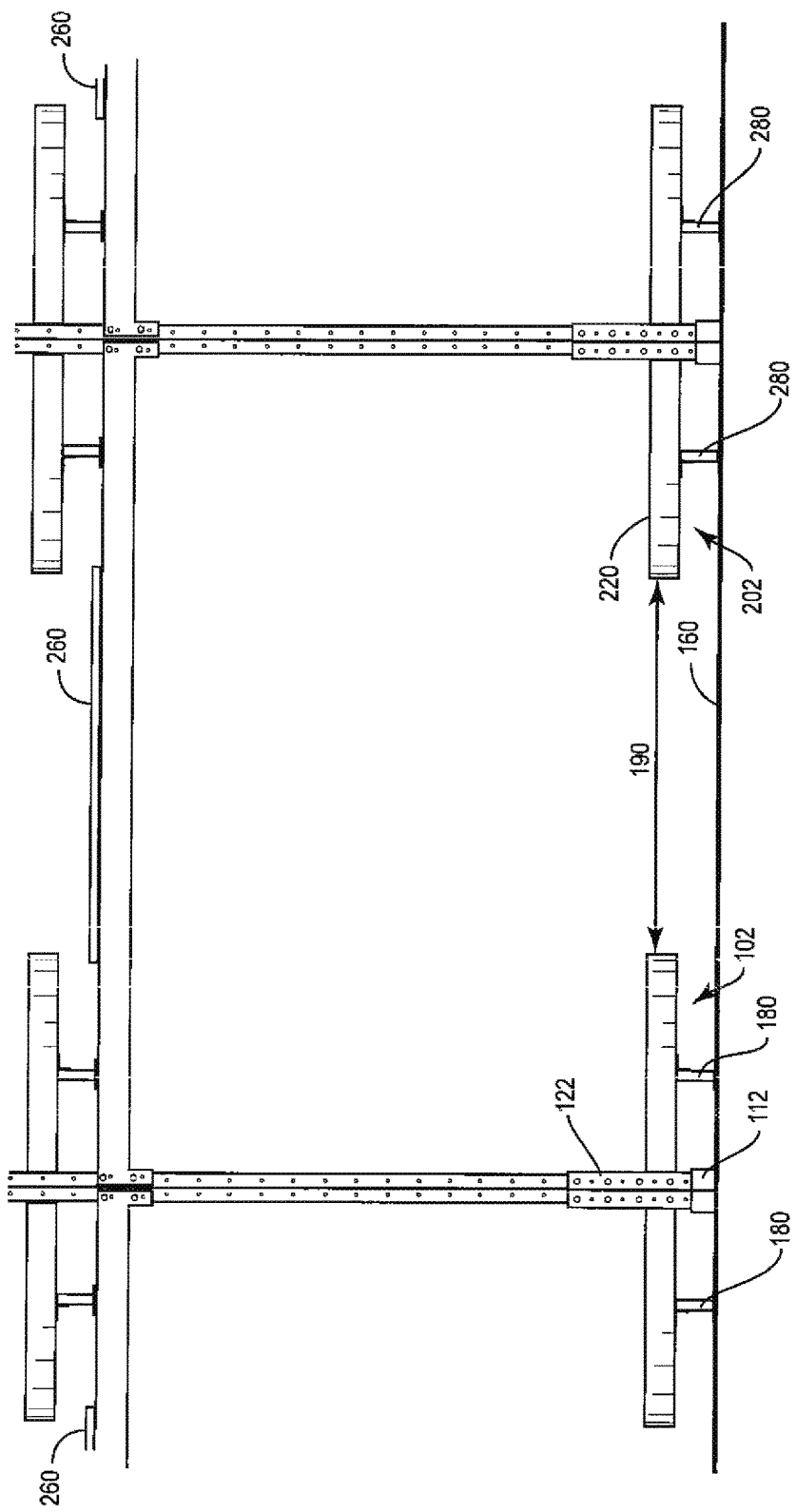
FIG. 7 is a front view of the storage system with a second level in accordance with aspects of the disclosure.

As shown in FIGS. 6 and 7, storage system 100 described above may be positioned on multiple levels as well. For example, the columns of the storage system may extend upward to a second level to support an additional storage system. Alternatively, separate columns may be used on subsequent levels. Thus, the columns used on the second level are separate from the columns on the first level. The second level may also implement vertical support bar 180 as described above so that there is not a horizontal bar extending between two separate storage systems. Thus, the horizontal bar ends at the support bar and the picker is able to grab products at subsequent units on the second level. In addition, the second level may include a base 260 in the form of an aisle for pickers to walk on. The base may be a metal or wood board that is strong enough to withstand the weight of at least one worker and various products. It should be noted that the storage system may be implemented on any number of levels above the first and second levels.

Storage system 100 may have units positioned on both sides of the columns. For example, storage platforms 102 and 202 each have two sets of storage units on both sides of the columns. The storage units on both sides of the columns may be designed similarly on both sides. In this regard, both sides of the storage units may be considered symmetric. This way, rows of storage platforms 102 and 202 repeat themselves throughout a warehouse. As an alternative, a separate set of columns may be used for the opposite side storage system, in which the separate set of columns may be positioned adjacent to the columns used for storage system 100.

Figure 8:
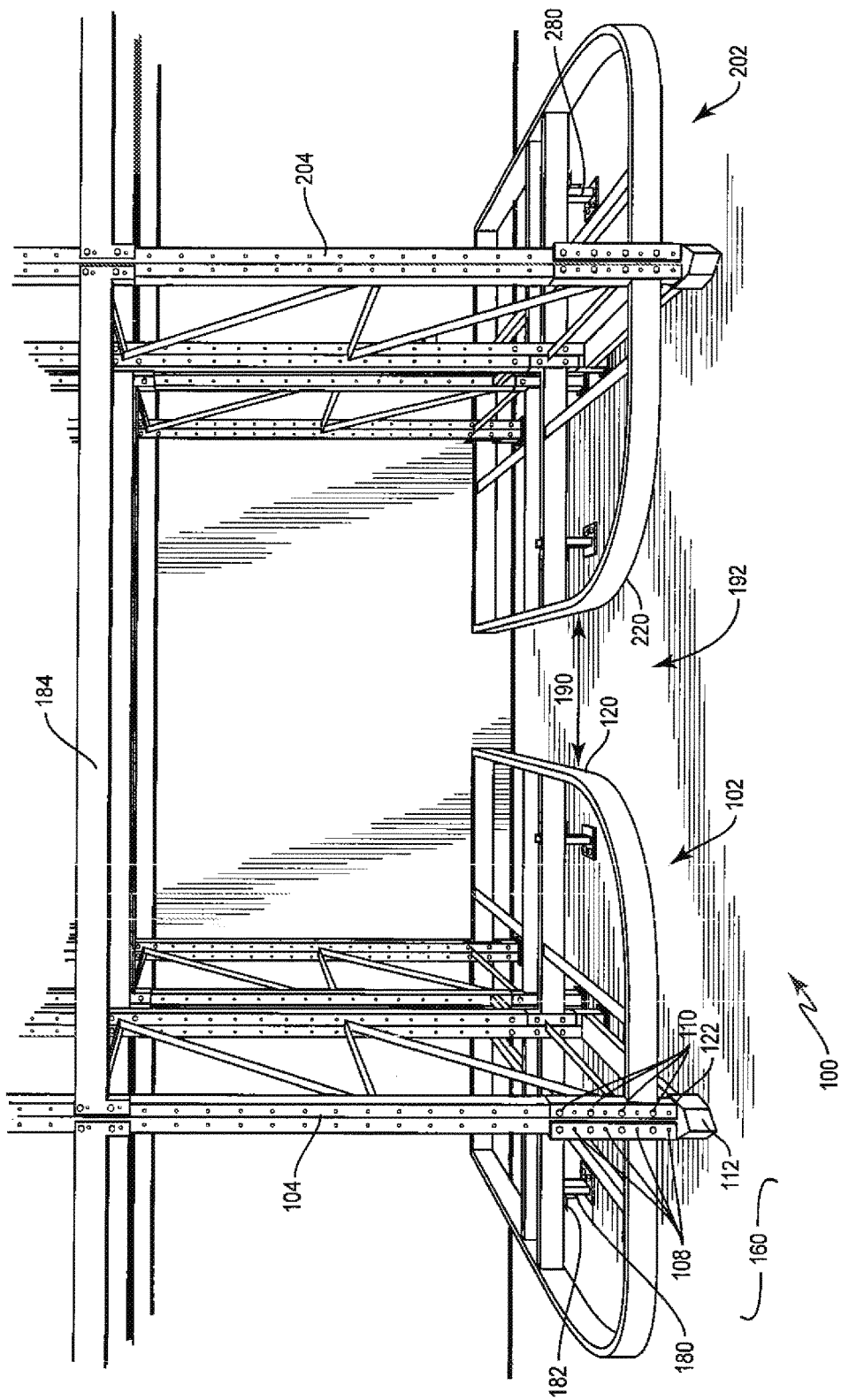
FIG. 8 depicts the storage system placed against a wall in accordance with aspects of the disclosure.

Storage system 100 described above may be placed against a wall or in an open area. For instance, FIG. 8 illustrates storage systems 100 against a wall. In this regard, an arm length of a forklift may influence the amount of storage units of the storage system. For example, if the forklift can carry two-pallets deep, then a business may only want a storage system against a wall to be two storage units deep. Furthermore, if the storage platform 102 is in an open area then the storage system 100 may be four storage units deep. This way the forklift can place products two-pallets deep from both sides of the storage system, thus utilizing the four storage units of the entire storage system 100. However, as discussed above the size of the storage units and pallets may be influenced by the particular business. In this regard, if a business is capable of using a forklift to carry four (or any number) pallets of product, then the business may use a four storage unit storage system positioned against the wall. Similarly, if the storage system is positioned in the open then the storage system may be eight storage units deep (i.e., four on both sides).

The foregoing is advantageous in that a picker is able to more efficiently pull additional products at a single time. Thus, when a picker is positioned on one side of a storage system to pull products and they need products from the other side of the storage system as well, the picker can instantly and simultaneously pull those products by walking through the unobstructed aisle. This saves time so that the user does not have to drive their truck or walk around to the opposite side of the storage system to pull the needed product. In addition, the additional space created between the support bar and the ground allows the user to be slightly closer to the products to pull, thus making the picker's job easier and helping to avoid injury.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

The invention claimed is:

1. A storage system, comprising:
a first storage rack, comprising:
a first series of columns; and
a first platform extending from and around the first series of columns, wherein a first outer edge of the first platform forms an end of the first storage rack;
a second storage rack, comprising:
a second series of columns;
a second platform extending from and around the second series of columns, wherein a second outer edge of the second platform forms an end of the second storage rack;
wherein the first storage rack is positioned adjacent to the second storage rack, and the first and second outer edges of the first and second platforms are a predetermined distance from each other thereby creating an aisle therebetween;
a series of overhead beams extend between the first and second series of columns and are directly connected thereto at locations below tops of said columns and a height above the aisle to avoid obstructing access, and provide support for first and second storage racks;
a base (260) extends along the overhead beams between the first and second series of columns and defines an aisle for supporting walkers thereon; an additional first platform extending from and around the first series of columns above the series of overhead beams; and an additional second platform extending from and around the second series of column above the series of overhead beams; with the base extending along the overhead beams between edges of the additional first and second platforms.

2. The storage system of claim 1, wherein the first and second outer edges of the first and second platforms run substantially parallel to each other at a location where the first and second outer edges are adjacent each other and substantially perpendicular to each other at locations where the edges are not adjacent one another.

3. The storage system of claim 1, wherein the first storage rack includes a first vertical support bar configured to provide support to the first platform spaced a distance above a base, and wherein the first support bar is set back from the first outer edge of the first storage rack.

4. The storage system of claim 3, further comprising a horizontal bar extending from the series of columns to the first platform, wherein the vertical support bar is attached to at least one of the horizontal bar or the first platform.

5. The storage system of claim 1, wherein no component of the first storage rack extends beyond the first outer edge of the first platform.

6. The storage system of claim 4, further comprising a second horizontal bar adjacent to the first horizontal bar, wherein the vertical support bar includes a bracket that connects to the first and second horizontal bars.

7. The storage system of claim 1, wherein the first and second platforms are not in contact with a base surface or ground.

8. The storage system of claim 7, wherein each said platform is positioned 1-15 inches above the base surface.

9. The storage rack of claim 1, wherein two corners where the parallel and perpendicular portions of each said outer edge meet are curved.

10. The storage rack of claim 9, configured to be situated against a wall, and wherein two other corners where the parallel and perpendicular portions of each said outer edge meet are sharp or at a right angle.

11. The storage system of claim 1, wherein the overhead beams are bolted to a column in each of the respective first and second series of columns with a minimum of three bolts.

12. The storage system of claim 1, wherein the edges of said additional first and second platforms each extend substantially perpendicularly from the respective first and second series of columns in an arcuate manner and curve at a right angle around the respective first and second series of columns at an arcuate portion, to form four arcuate corners.

13. The storage system of claim 1, wherein
a first series of horizontal bars respectively interconnecting each said column with said additional first platform,
a second series of horizontal bars respectively interconnecting each said column with said additional second platform,
a first series of separate vertical support bars, each said vertical support bar positioned upon a respective overhead beam to support a respective horizontal bar between said respective column and said additional first platform spaced above the overhead beams on either side of said respective column, and
a second series of separate vertical support bars, each said vertical support bar positioned upon a respective overhead beam to support a respective horizontal bar between said respective column and said additional second platform spaced above the overhead beams on either side of said respective column.

14. The storage system of claim 13, wherein
the vertical support bars are set back from the outer edges of the additional first and second platforms,
the respective vertical support bars each include a bracket connected to adjacent horizontal bars, and
the vertical support bars each terminate a distance below the respective additional first or second platform.

* * * * *